Figure 1:
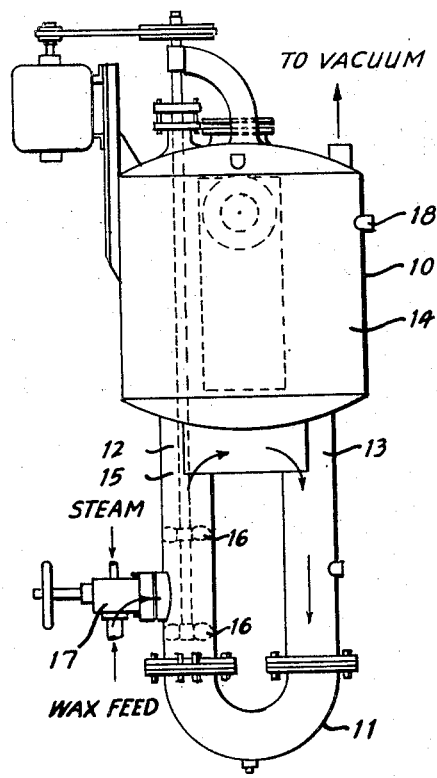

Dec. 21, 1948.    O. J. SWENSON    2,456,655
WAX PRODUCTION

Filed July 12, 1946                2 Sheets-Sheet 1

INVENTOR
Oscar J. Swenson
BY Robert J. Leahy
ATTORNEY

Dec. 21, 1948.  O. J. SWENSON  2,456,655
WAX PRODUCTION
Filed July 12, 1946  2 Sheets-Sheet 2

INVENTOR.
Oscar J. Swenson
BY
ATTORNEY

Patented Dec. 21, 1948

2,456,655

UNITED STATES PATENT OFFICE 2,456,655

WAX PRODUCTION

Oscar J. Swenson, Ithaca, N. Y., assignor to Colonial Sugars Company, New York, N. Y., a corporation of New Jersey, and S. C. Johnson & Son, Inc., Racine, Wis., a corporation of Wisconsin Application July 12, 1946, Serial No. 683,136

12 Claims. (Cl. 260—428.5)

This invention relates to the production of wax, and more particularly relates to an improved method of separating crude sugar cane wax into various fractions.

Various methods are known for separating crude sugar cane wax from clarification muds, or other sugar cane factory waste products by the use of organic solvents, such as toluene. Several investigators have separated crude sugar cane wax into a soluble fraction and a hard wax fraction; one recent method is described in U. S. Patent No. 2,381,420 to Balch. By this method chipped or broken crude wax pieces are placed in a container and covered with a fat solvent, such as acetone, and the fatty portions are separated from the crude wax by a process of diffusing into the solvent. The disadvantages of this process, however, are that the diffusion takes a day, and is preferably repeated from three to seven times. From a commercial standpoint the process is inefficient and would be costly because of the length of time needed to carry out the process. In addition, the separation of the acetone solution from the insoluble solids is difficult.

Now, in accordance with my invention, I have developed a practical process for refining crude sugar cane wax by separating it into three principal components which are basically different in physical and chemical characteristics. The first or so-called soft fraction is a dark green oil at room temperature. The second or waxy fraction is a brittle, brown wax-like material having a melting point of about 75° C. The third or so-called resinous fraction is a black pitch-like material with no definite melting point, but which softens at temperatures varying from about 100° to 160° C.

My method comprises contacting molten crude sugar cane wax with a fat solvent in liquid phase to form a hot wax solution, precipitating a hard wax fraction from said hot wax solution by contacting the hot wax solution with a fat solvent-wax slurry, separating the soluble portion from the precipitate in the slurry, reslurrying the precipitate by contacting with a fat solvent, heating said slurry sufficiently to put the wax into solution while keeping the solvent in liquid phase, and separating the wax solvent from the resinous fraction.

Now, having indicated in a general way, the nature and purpose of this invention, the following examples will illustrate the invention. It is to be understood, however, that such examples are presented merely as illustrations of the invention, and are not to be construed as limiting the same.

In the examples, the ingredients are given in parts by weight, unless otherwise indicated.

Example 1

One hundred pounds of crude sugar cane wax was melted, filtered to remove any solid foreign matter, and mixed with 71 pounds of liquid acetone which had been heated under pressure to a temperature of 98° to 100° C. The solution of acetone and crude wax at about 100° C. was injected into an agitated vessel containing a slurry which consisted of a suspension of solid hard wax fraction in a solution of the soft fraction in acetone. The temperature of the slurry was about 25° to 30° C. This temperature was maintained by connecting the vessel to a reflux condenser which in turn is connected to a vacuum line. The vacuum was held at 240 mm. of Hg absolute which caused the acetone to boil at 25° to 30° C. The heat introduced into the vessel was thus removed by the vaporizing acetone which then passed to the reflux condenser and was returned to the vessel as condensate. As the hot acetone-crude wax solution was injected into the slurry, the acetone flashes, thus cooling and solidifying the crude wax to form more slurry. Further cooling was effected by contact of the hot entering stream with the relatively cold slurry.

Four hundred two pounds of additional acetone was introduced into the vessel at a rate sufficient to give the desired concentration of slurry. The hot acetone-crude wax solution and the additional acetone was fed continuously into the vessel. The slurry produced in this manner was easily filterable and was filtered in conventional filtration equipment. The filter cake was washed with an additional 400 pounds of acetone. The filtrate containing the soft fraction weighed 705 pounds and was evaporated in conventional evaporating equipment. Thirty-three pounds of soft fraction was recovered. This soft fraction was a dark green oil at room temperature.

The filter cake resulting from the filtration of the slurry weighing 268 pounds was repulped with 335 pounds of acetone. The resulting slurry was then heated to a temperature of about 100° C. under sufficient pressure to keep the acetone in liquid form at which temperature the wax fraction was all in solution. Upon heating almost instantaneously two immiscible phases formed, the light layer weighing 577.6 pounds contained the waxy fraction, and the heavy layer weighing 25.4 pounds contained the resinous fraction. The two immiscible phases were separated by decantation. The light layer was then evaporated, the final traces of acetone being removed in a batch vacuum evaporation. The residue left after evaporation was a brittle, brown waxy fraction having a melting point of about 75° C. which weighed 54.9 pounds. The heavy layer was removed to a flash chamber by which the acetone was removed. Substantially all of the relatively small amount of acetone present flashed into vapor. The balance was removed by drawing a vacuum on the vessel for a short time, meanwhile supplying heat to it. The solids recovered constituted a black pitch-like resinous fraction weighing 12.1 pounds with no definite melting point but which softened at temperature varying from about 100° to 160° C.

*Example 2*

Example 1 was repeated except that methylethylketone was substituted for the acetone as the fat solvent. It was the equivalent of acetone as a fat solvent for use in this process.

From the foregoing examples a method has been illustrated by which crude sugar cane wax may be separated into three principal components.

While acetone and methylethylketone have been shown as the fat solvents, the invention is not so limited. Although these solvents are preferred, other known fat solvents such as ethyl ether, hexane, heptane, pentane, and the like may be used.

It is essential that the crude sugar cane wax be heated until it is molten. It is also essential that the fat solvent be in liquid phase, and as the boiling point of some of the fat solvents, such as acetone is below the melting point of the wax, i. e. about 75° C., the procedure must be carried out under pressure sufficient to keep the fat solvent from boiling. While the minimum temperature at which the crude sugar cane wax becomes molten and can be placed in solution in the fat solvent is about 75° C., the upper temperature limit will depend upon the ability of the crude wax to withstand the temperature. Operation at a higher temperature than necessary to insure that the crude wax is molten has the disadvantage of increasing the amount of heat required to be added and subsequently removed, as well as increasing the pressure necessary to maintain the fat solvent in liquid phase. For the practical reason of easy operation, a temperature of from about 75° to 125° C. is recommended, although a temperature of 98° to 100° C. has been used in carrying out the examples.

The proportions of fat solvent to crude wax in the fat solvent-crude wax solution which is contacted with the fat solvent-wax slurry, may be varied from about 0.1 to 0.7 pound of fat solvent per pound of wax. However, a ratio of 0.5 pound of fat solvent per pound of crude wax is preferred. The use of too little fat solvent results in poor disintegration of the solidified wax on cooling, with resulting poor extraction of the soft fraction. Too much fat solvent increases the amount of heat to be added and removed, and also on cooling yields a slurry which has poor filtration characteristics than when the amount of fat solvent shown within the above range is used.

To give the desired concentration of slurry in the slurry vessel, additional fat solvent is introduced into the vessel. The relative proportions of fat solvent to crude wax in the slurry may be varied from a minimum of about 4 pounds of fat solvent per pound of crude wax upward. In practice it has been found that a ratio of about 4 pounds to about 8 pounds of fat solvent per pound of crude wax is preferred. Lesser amounts of fat solvent yields a slurry that is too thick to handle effectively in the filtration operation. Greater amounts of fat solvents have the disadvantage of holding too much of the hard wax fraction in solution and of requiring more heat to evaporate the fat solvent away from the soft fraction after the filtration operation.

The temperature of 25° to 30° C. at which the slurry was maintained in Example 1 was chosen for practical reasons. While temperatures above this range may be used, the amount of hard fraction held in solution will be increased. Lower temperatures may be used with very efficient results except that they will require the use of mechanical refrigeration to cool the reflux condenser, while a temperature of 25° to 30° C. can be obtained with cooling water in most localities.

It is suggested that as the hot wax solvent-crude wax solution is introduced into the cold slurry that adequate agitation at the point of entry of the solution be provided. In this manner a slurry of finely divided particles is produced which may effectively contact solvent and solids to permit good extraction of the soft fraction and at the same time retain a physical structure of the solids which will permit readily separating them from the solution by filtration.

While in Example 1 the acetone from the crude wax solution was vaporized as it was injected into the agitated vessel, other methods of precipitating the hard wax fraction from the hot wax solution may be used. For example, the contacting of the hot wax solution with the cooled wax slurry is sufficient.

Figure 2:
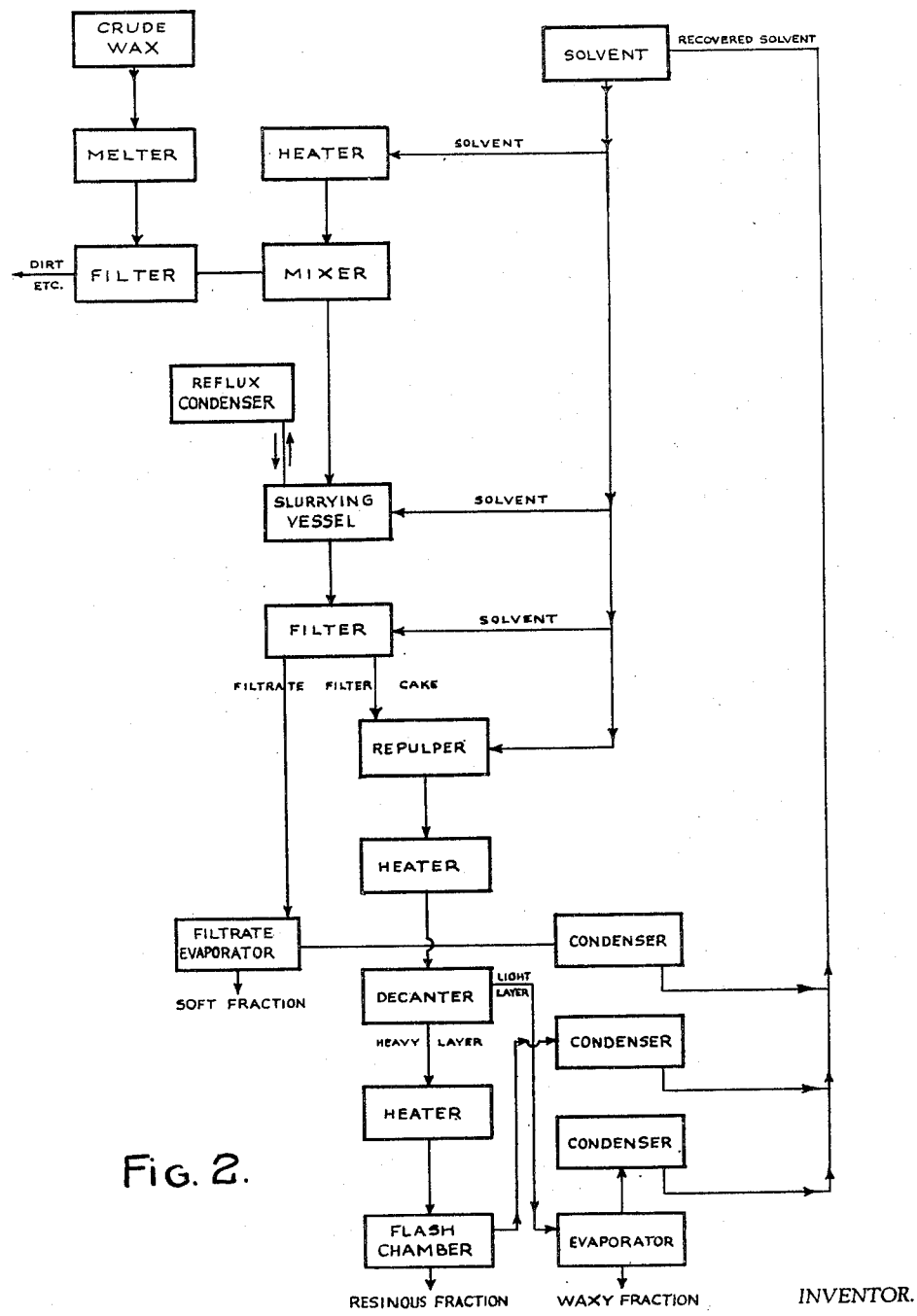

Figure 2 is a flow sheet of the process.

While various apparatus may be used to carry out this process, for small scale operations a vessel 10, of which Figure 1 is a schematic drawing, consisting essentially of a vertical mounted U-tube 11, the top end of the legs 12 and 13 of which are connected to a cylindrical chamber 14 which serves to connect the legs 12 and 13 to complete the slurry path and as a disengaging space for liquid and vapor, has been found convenient. One of the legs 12 contains an agitator shaft 15 carrying one or more propellers 16 which circulates the slurry upward past an injection valve. The vapor formed in flashing serves as a vapor lift to assist the propellers 16 in causing circulation. The hot fat solvent-crude wax solution and the additional fat solvent to give proper slurry concentrations may be fed continuously, if desired. In this case the slurry is thus formed continuously and may be drained off through an overflow port 18. Minimum holdup of slurry is a desirable feature of this vessel design, as it has been found that prolonged retention of slurry in the system impairs its filtration characteristics. Aging of the slurry without agitation has a lesser detrimental effect and has some beneficial effect on extraction efficiency of the soft fraction, so that aging of the slurry up to about one half an hour may be considered desirable.

The equipment used to filter the slurry produced in the manner described may be conventional filtration equipment. However, a loss of solvent vapor may be prevented by using a continuous rotary filter of the totally enclosed type.

Likewise the evaporating of the filtrate may be carried out in conventional evaporating equipment. The last trace of fat solvent is difficult to remove with ordinary evaporating equipment, but it may be stripped out or removed in a vacuum evaporator.

To carry out the process of separating the hard fraction into the wax and resinous fractions, the wet filter cake is repulped with fat solvent to give a slurry containing about 4 pounds upward of fat solvent per pound of solids. In practice a ratio of about 4 to about 8 pounds of fat solvent per pound of solids is preferred. The slurry is then heated to a temperature sufficient to place the wax in solution. Since it is necessary to maintain the fat solvent in liquid phase, in the event that a fat solvent having a boiling point of less than 75° C. is used, it will be necessary to carry out the heating under pressure. The range of heating temperatures and pressures will correspond to that used in the preparation of the crude wax-fat solvent solution as described above.

It has been found that much better results are obtained by heating the repulped slurry than by heating small pieces of hard fraction and solvent. In the latter case the small particles of hard fraction become coated with sticky resinous fraction and the whole particle settles, thus occluding some of the wax fraction.

The heating of the repulped filter cake from the first stage of the process together with fat solvent, gives almost instantaneously two immiscible phases which can be separated, for example, by decantation, either by batch or a continuous method. In practice it has been found convenient to separate the light layer containing the waxy fraction continuously. This light layer is then evaporated in conventional evaporating equipment to remove the fat solvent with the final traces preferably removed in a batch vacuum evaporator or by stripping. The residue left after evaporation of the acetone is the waxy fraction having a melting point of about 75° C.

The heavy layer or resinous solution is preferably withdrawn periodically into a receiver from which it may be blown from its condition of high temperature into another vessel at low pressure. In this process substantially all of the relatively small amount of fat solvent present in the solution flashes into vapor. The balance is then removed by drawing a vacuum on the vessel while supplying heat to it. The solids which collect in the flash chamber may be removed periodically. These solids constitute the resinous fraction which has no definite melting point but which softens at a temperature from 100° to 160° C.

Other methods of recovering the waxy fraction and the resinous fraction may be used if desired.

From the foregoing will be seen that I have developed a practical process for refining crude sugar cane wax by separating it into three principal components. By my process the separation of the soluble fatty portion from the hard wax fraction is almost instantaneous. Furthermore, by proper control of conditions, as disclosed herein, the insoluble solids are present in a physical form which renders separation from the solution relatively easy. The method developed also lends itself to continuous separation which, together with a rapid rate of filtration achieved, reduces the solvent inventory in the process and the fire hazard to a minimum. If preferred, however, the process may be carried as a batch operation.

I claim:

1. A process for separating crude cane wax into various fractions comprising contacting molten crude sugar cane wax with a fat solvent selected from the group consisting of acetone, methylethylketone, ethyl ether, pentane, hexane and heptane in liquid phase to form a hot wax solution, the ratio of fat solvent per pound of crude wax being from about 0.1 to about 0.7, contacting said wax solution with a solvent-wax slurry in which the solvent is selected from the group consisting of acetone, methylethylketone, ethyl ether, pentane, hexane and heptane and the ratio of solvent to wax being at least 4 to 1 by weight, at a temperature at which the hard fraction precipitates from said solution, separating the soluble portion from the precipitate in said solution, reslurrying said precipitate by contacting with a fat solvent selected from the group consisting of acetone, methylethylketone, ethyl ether, pentane, hexane and heptane, heating said slurry sufficiently to put the solids into solution while keeping said solvent in liquid phase, and separating the wax fraction from the resinous fraction.

2. A process for separating crude sugar cane wax into various fractions comprising contacting molten crude sugar cane wax with acetone in liquid phase to form a hot wax solution the ratio of acetone per pound of crude wax being from 0.1 to about 0.7, contacting said wax solution with an acetone wax slurry, at a temperature at which the hard fraction precipitates from said solution, the ratio of acetone to wax being at least 4 to 1 by weight, separating the soluble portion from the precipitate in said slurry, reslurrying said precipitate by contacting with acetone, heating said slurry sufficiently to put the solids into solution, while keeping the acetone in liquid phase, and separating the wax fraction from the resinous fraction.

3. A process for separating crude sugar cane wax into various fractions comprising contacting molten crude sugar cane wax with methylethylketone in liquid phase to form a hot wax solution, the ratio of methylethylketone per pound of crude wax being from about 0.1 to about 0.7, contacting said wax solution with a methylethylketone-wax slurry, at a temperature at which the hard fraction precipitates from solution, the ratio of methylethylketone to wax being at least 4 to 1 by weight, separating the soluble portion from the precipitate in said slurry, reslurrying said precipitate by contacting with methylethylketone, heating said slurry sufficiently to put the solids into solution, while keeping the methylethylketone in liquid phase, and separating the wax fraction from the resinous fraction.

4. A process for separating crude sugar cane wax into various fractions comprising contacting molten crude sugar cane wax with hexane in liquid phase at a temperature of at least 75° C. to form a hot wax solution, the ratio of hexane per pound of crude wax being from about 0.1 to about 0.7, contacting said wax solution with a hexane-wax slurry, at a temperature at which the hard fraction precipitates from said solution, the ratio of hexane to wax being at least 4 to 1 by weight, separating the soluble portion from the precipitate in said slurry, reslurrying said precipitate by contacting with a fat solvent, heating said slurry sufficiently to put the solids into solution, while keeping the solvent in liquid phase, and separating the wax fraction from the resinous fraction.

5. A process for separating crude sugar cane wax into various fractions comprising contacting molten crude sugar cane wax with acetone in liquid phase to form a hot wax solution, the ratio of acetone per pound of crude wax being from about 0.1 to about 0.7, injecting the hot wax solution into an acetone-wax slurry in such manner that acetone is vaporized, the ratio of acetone to wax being at least 4 to 1 by weight, separating the soluble portion from the precipitate in said slurry, reslurrying said precipitate by contacting with acetone, heating said slurry sufficiently to put the solids into solution, while keeping the acetone in liquid phase, and separating the wax fraction from the resinous fraction.

6. A process for separating crude sugar cane wax into various fractions comprising contacting molten crude sugar cane wax with methylethylketone in liquid phase to form a hot wax solution, the ratio of methylethylketone per pound of crude wax being from about 0.1 to about 0.7, injecting the hot wax solution into a methylethylketone-wax slurry in such manner that methylethylketone is vaporized, the ratio of methylethylketone to wax being at least 4 to 1 by weight, separating the soluble portion from the precipitate in said slurry, reslurrying said precipitate by contacting with methylethylketone, heating said slurry sufficiently to put the solids into solution, while keeping the methylethylketone in liquid phase, and separating the wax fraction from the resinous fraction.

7. A process for separating crude sugar cane wax into various fractions comprising contacting molten crude sugar cane wax with hexane in liquid phase to form a hot wax solution, the ratio of hexane per pound of crude wax being from about 0.1 to about 0.7, injecting the hot wax solution into a hexane-wax slurry in such manner that hexane is vaporized, the ratio of hexane to wax being at least 4 to 1 by weight, separating the soluble portion from the precipitate in said slurry, reslurrying said precipitate by contacting with a fat solvent, heating said slurry sufficiently to put the solids into solution, while keeping the solvent in liquid phase, and separating the wax fraction from the resinous fraction.

8. A process for separating crude sugar cane wax into various fractions comprising contacting molten crude sugar cane wax with acetone in liquid phase to form a hot wax solution, the ratio of acetone per pound of crude wax being from about 0.1 to about 0.7, precipitating a hard wax fraction from said hot wax solution by removing said hot-wax solution from a region of high pressure to a lower pressure area containing an acetone-wax slurry, the ratio of acetone to wax being at least 4 to 1 by weight, reslurrying said precipitate by contacting with acetone, heating said slurry sufficiently to put the solids into solution, while keeping the acetone in liquid phase, and separating the wax fraction from the resinous fraction.

9. A process for separating crude sugar cane wax into various fractions comprising contacting molten crude sugar cane wax with acetone in liquid phase to form a hot wax solution, the ratio of acetone per pound of crude wax being from about 0.1 to about 0.7, precipitating a hard wax fraction from said hot wax solution by contacting with an acetone-wax slurry maintained at a temperature of about 25° C., the ratio of acetone to wax being at least 4 to 1 by weight, reslurrying said precipitate by contacting with acetone, heating said slurry sufficiently to put the solids into solution, while keeping the solvent in liquid phase, and separating the wax fraction from the resinous fraction.

10. A process for separating crude sugar cane wax into various fractions comprising contacting molten crude sugar cane wax with acetone in liquid phase to form a hot wax solution, the ratio of acetone per pound of crude wax being from 0.1 to about 0.7, contacting said wax solution with an acetone-wax slurry, at a temperature at which the hard fraction precipitates from said solution, the ratio of acetone to wax being at least 4 to 1 by weight, separating by filtration the soluble portion from the precipitate in said slurry and forming a filter cake, reslurrying said filter cake by contacting with acetone, heating said slurry sufficiently to put the solids into solution, while keeping the acetone in liquid phase, and separating the wax fraction from the resinous fraction.

11. A process for separating crude sugar cane wax into various fractions comprising contacting molten crude sugar cane wax with methylethylketone in liquid phase to form a hot wax solution, the ratio of methylethylketone per pound of crude wax being from about 0.1 to about 0.7, contacting said wax solution with a methylethylketone-wax slurry, at a temperature at which the hard fraction precipitates from solution, the ratio of methylethylketone to wax being at least 4 to 1 by weight, separating by filtration the soluble portion from the precipitate in said slurry and forming a filter cake, reslurrying said filter cake by contacting with methylethylketone, heating said slurry sufficiently to put the solids into solution, while keeping the methylethylketone in liquid phase, and separating the wax fraction from the resinous fraction.

12. A process for separating crude sugar cane wax into various fractions comprising contacting molten crude sugar cane wax with hexane in liquid phase to form a hot wax solution, the ratio of hexane per pound of crude wax being from about 0.1 to about 0.7, contacting said wax solution with a hexane-wax slurry, at a temperature at which the hard fraction precipitates from said solution, the ratio of hexane to wax being at least 4 to 1 by weight, separating by filtration the soluble portion from the precipitate in said slurry and forming a filter cake, reslurrying said filter cake by contacting with a fat solvent, heating said slurry sufficiently to put the solids into solution, while keeping the fat solvent in liquid phase, and separating the wax fraction from the resinous fraction.

OSCAR J. SWENSON.

REFERENCES CITED

The following references are of record in the file of this patent:

UNITED STATES PATENTS

| Number | Name | Date |
|---|---|---|
| 2,381,420 | Balch | Aug. 7, 1945 |
| 2,391,893 | Goepfert | Jan. 1, 1946 |